March 26, 1957  A. KALENIAN  2,786,689
POWER OPERATED CHUCK

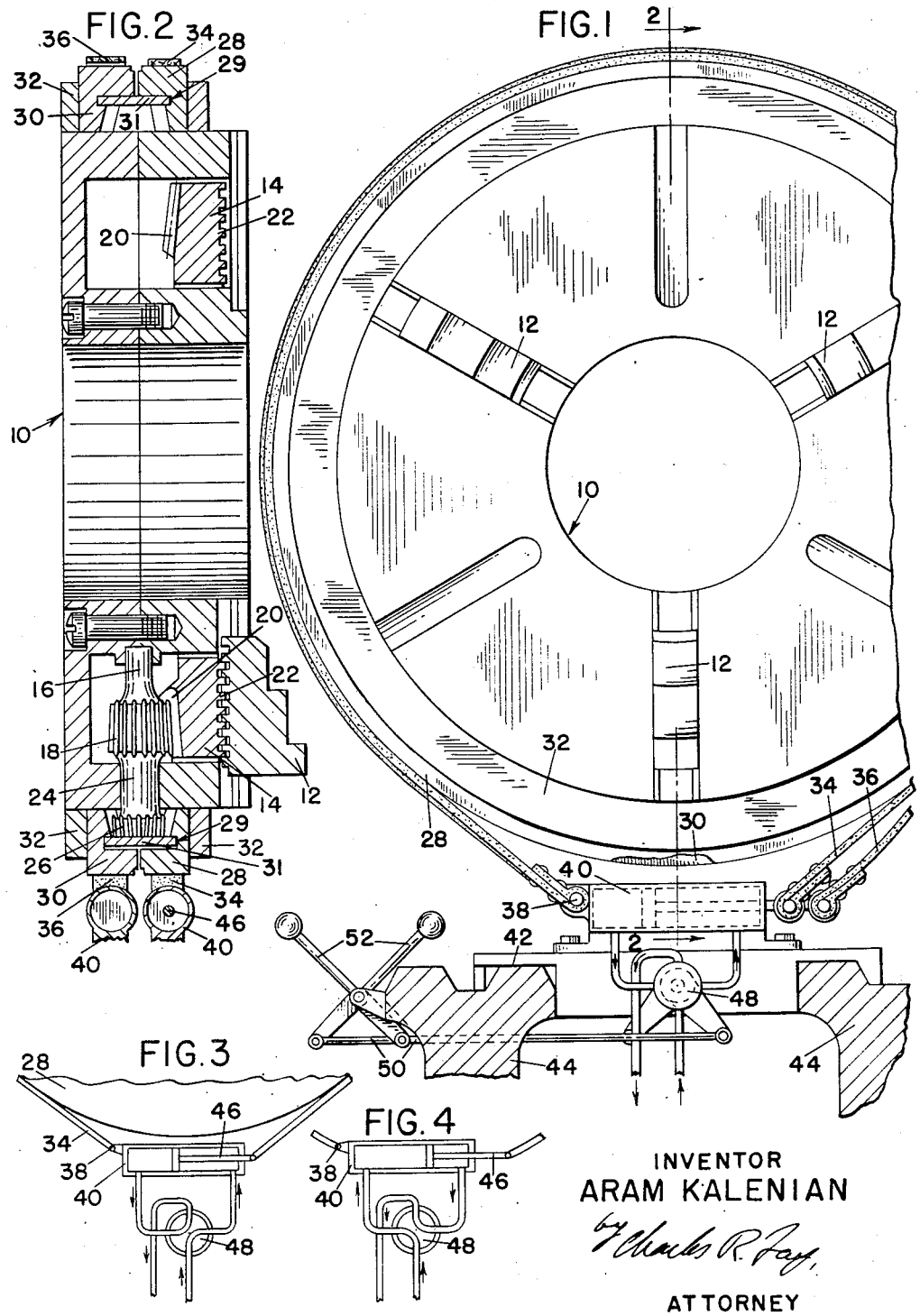

Filed Nov. 4, 1954  2 Sheets-Sheet 2

INVENTOR
ARAM KALENIAN

ATTORNEY

United States Patent Office 2,786,689
Patented Mar. 26, 1957

2,786,689
POWER OPERATED CHUCK

Aram Kalenian, Westboro, Mass.

Application November 4, 1954, Serial No. 466,863

1 Claim. (Cl. 279—116)

This invention relates to a new and improved power-operated chuck jaw mechanism, the principal object of which resides in the provision of means for opening or closing the jaws of a chuck at any time or point in the operation of the machine, so that regardless of the rotative position of the chuck, it may be operated to remove a workpiece and to substitute another one, or to advance a workpiece, all without the use of any tool, wrench, etc.

Further objects of the invention reside in the provision of a device for operating a rotary chuck of the class described comprising a pair of toothed annular rings or the like mounted upon the exterior surface of the chuck and free to slide thereon peripherally but not otherwise, said rings being in mesh with one or more pinions located between the rings, said pinion being mounted upon a pin or the like which in turn operates the scroll of the chuck to move the jaws in and out, the scroll being operated for all the jaws on the chuck face simultaneously, in combination with means for relatively fixing either annular ring with respect to the chuck, or for causing relative motion between the ring and the chuck whereby the pinion will be rotated, the pin on which the pinion is located being mounted for rotation at a fixed location in the chuck body; and the provision of a double set of the above devices for selectively braking either ring so as to provide for the relative motion between the rings and the chuck body described above to actuate the pinion and its pin in either direction and thereby the chuck jaws in either direction.

Other objects and advantages of the invention will appear hereinafter.

Reference is to be had to the accompanying drawings, in which

Fig. 1 is a view in front elevation illustrating a chuck according to the present invention, parts being in section;

Fig. 2 is a section on line 2—2 of Fig. 1;

Figs. 3 and 4 illustrate diagrammatically the operation of the hydraulic means for actuating the device.

Figure 5:
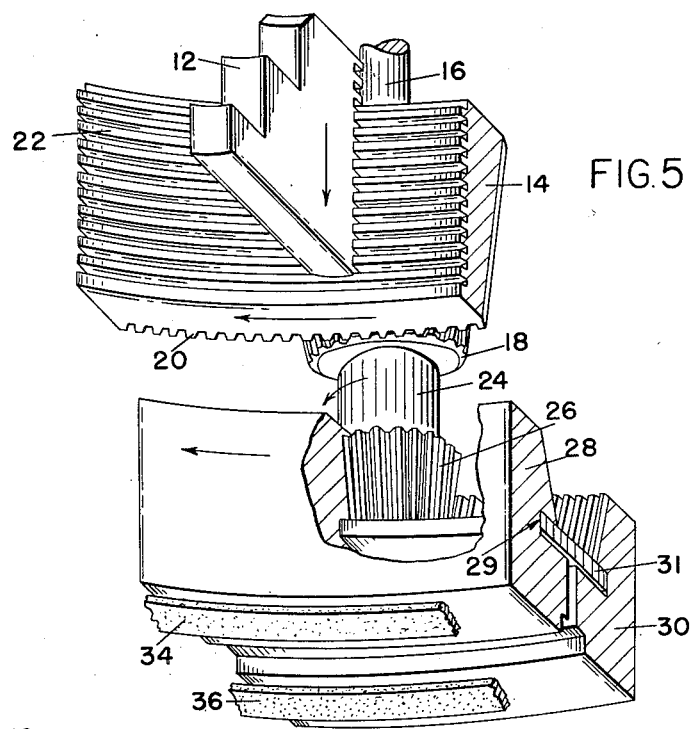
Figs. 5 and 6 are perspective views on an enlarged scale illustrating the operation of the chuck.
Figure 6:
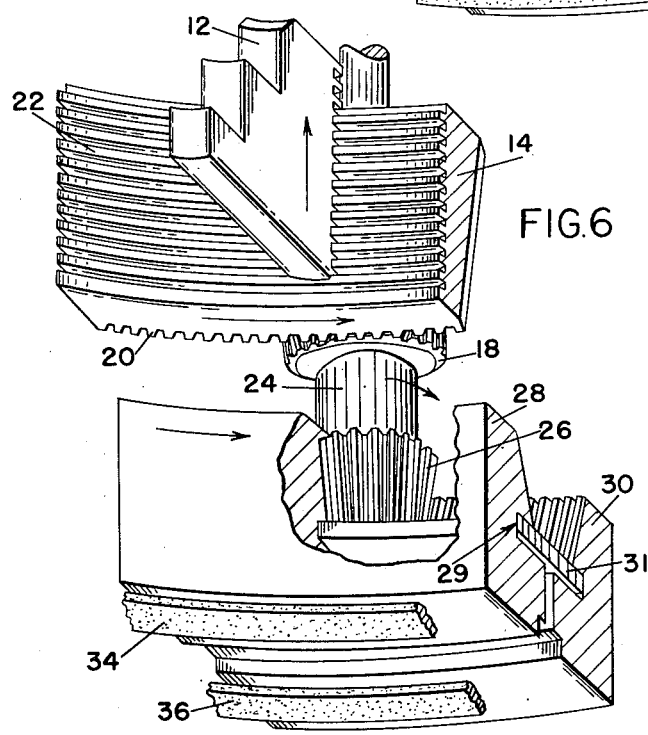

Reference is made to my copending application Serial No. 457,951, filed September 23, 1954, now Patent No. 2,726,093 issued December 6, 1955, the present invention showing a different mechanism for operating the jaws of a chuck. In the present case, the chuck body is generally indicated at 10 and there are shown three jaws 12 which are adapted to be moved radially in and out in guideways provided therefor by means of the scroll 14, as is usual in manually-operated chucks of this nature. The center of the chuck is open as distinct from the ordinary power-operated chuck.

In order to operate the scroll 14, there is provided a rotary pin 16 having a pinion gear 18 fixed with respect thereto and meshing with corresponding gear teeth 20 at the reverse side of the respective scroll 14. As the pin 16 is rotated, it will slide the scroll in a circumferential path and this in turn by meshing of the respective spiral gear teeth 22 will cause the jaws 12 to move in and out as above outlined.

In the present case, the pin 16 extends outwardly radially as indicated at 24 and it is provided with a pinion 26 fixed relatively thereto and in mesh simultaneously with gear teeth at the inside aspect of two separate annular toothed rings 28 and 30.

The tooth rings 28 and 30 are slidably mounted on the exterior periphery of the rotary chuck and may be held against lateral displacement by fixed rings 32. The toothed rings 28 and 30 are grooved at 29 to receive a dust and oil-band 31. It will be clear that as long as the chuck rotates, rings 28 and 30 will be carried with it and in fixed relation to teeth 26, so that pin 16 will not rotate. However, if either one of the rings 28, 30 is provided with a motion which is relative to the chuck, this will cause the pinion 26 to rotate and this will of course cause pin 16 to rotate and the jaws 12 to move in or out, depending upon the direction of rotation of the pin 16.

The direction of rotation of the pin 16 of course depends upon the relative difference of motion between the rings 28 and 30 and the chuck. In the present case, it is proposed to apply braking means to both of these annular teeth rings 28 and 30 and means for applying the brakes separately so as to slow down the rotation of either one of the rings without, however, slowing down the rotation of the chuck.

In other words, a differential speed or motion is applied to one of the rings and the chuck so that even though the chuck might be in the act of slowing down, or speeding up, the application of the brake will cause rotation of pin 16.

In the present case, there are provided a pair of brake-bands which are indicated at 34 and 36. Each brake-band is fixed at one end as is indicated at 38 for instance to a housing 40, which is in turn mounted on a bracket or other support 42 which may be mounted on the ways 44 of whatever machine the device is to be used with.

The other ends of the brake-bands are movable or floating and each one is secured to the end of a respective piston rod 46, it being understood that there is a cylinder 40 and a piston rod 46 for each brake-band.

Appropriate means is provided for operating the pistons in the cylinders and in diagrammatic form this may include a rotary valve generally indicated at 48 operated by means of the links 50 in turn operated by the pair of handles 52, so that each cylinder is operated separately.

In the Fig. 3 position, the cylinder is shown with the pressure applied to the top of the piston, so that the brake-band 34 is tightened, and in Fig. 4 the valve has been moved to provide for drain at the top of the piston and power applied to the bottom thereof, so that the brake-band is loosened. Any other similar means may be employed for applying the brake-bands as desired, but there should be means for independently operating either brake-band as the rings 28 and 30 cannot be operated simultaneously.

In the operation of the device, if it is desired to open the jaws, the operator merely pulls the appropriate lever 52, so that the appropriate brake-band will be tightened by means of the retraction of the respective piston in its cylinder 40. It is believed that the operation will be clear. Once the brake-band exerts pressure on its annular toothed ring in order to provide a differential motion between the ring and the chuck, the jaws will be moved. The jaws are clearly and quickly actuated in either direction to both open and close the chuck without stopping the same, but of course the machine may be slowing down as the jaws are opened and it may be increasing in speed from a low point or a stopped point when the jaws are brought in to clamp the new workpiece.

This invention will be seen to provide a relatively simple mechanism for avoiding indexing of a rotary chuck and to provide essentially power-operated means for opening and closing the chuck in an extremely short time, thus increasing production and avoiding stopped time for the machine in changing workpieces, etc. It is immaterial where the chuck stops and it is not necessary to stop the chuck in order to open and close the jaws thereof for the purpose described.

Having thus described my invention and the advantages thereof, I do not wish to be limited to the details herein disclosed, otherwise than as set forth in the claim, but what I claim is:

Means for operating the jaws of a rotary chuck comprising a pair of annular circumferential rings mounted side-by-side on the chuck body at the periphery thereof, a scroll for operating the jaws, a radially extending pin between the rings having toothed engagement with said rings and said scroll, the latter moving the jaws upon rotation of the pin, said pin rotating upon a differential motion between either ring and the chuck body, and means to impress a differential of motion between the chuck body and a ring, said last-named means comprising a brake-band for each ring and independent means to actuate either brake-band selectively, said brake-bands being circumferential and the means actuating the same compressing the bands onto the rings.

References Cited in the file of this patent

UNITED STATES PATENTS

| | | |
|---|---|---|
| 237,731 | Doyle | Feb. 15, 1881 |
| 1,238,546 | Manuel et al. | Aug. 28, 1917 |
| 1,280,396 | Chevoir | Oct. 1, 1918 |
| 1,838,714 | Stevens | Dec. 29, 1931 |